United States Patent
Ning et al.

(10) Patent No.: US 11,474,558 B2
(45) Date of Patent: Oct. 18, 2022

(54) TIME SYNCHRONOUS HYBRID ANALOG AND DIGITAL SENSOR DATA ACQUISITION SYSTEM AND METHOD THEREOF

(71) Applicants: DALIAN UNIVERSITY OF TECHNOLOGY, Liaoning (CN); CHENGDU SCIENIC LIMITED COMPANY, Sichuan (CN)

(72) Inventors: Dezhi Ning, Liaoning (CN); Yichao Sun, Liaoning (CN); Chongwei Zhang, Liaoning (CN); Di Wu, Liaoning (CN); Qing Zhou, Liaoning (CN); Heyin Li, Liaoning (CN)

(73) Assignees: DALIAN UNIVERSITY OF TECHNOLOGY, Liaoning (CN); CHENGDU SCIENIC LIMITED COMPANY, Sichuan (CN)

(*) Notice: Subject to any disclaimer, the term of this patent is extended or adjusted under 35 U.S.C. 154(b) by 3 days.

(21) Appl. No.: 17/278,934

(22) PCT Filed: Nov. 12, 2020

(86) PCT No.: PCT/CN2020/128231
§ 371 (c)(1),
(2) Date: Mar. 23, 2021

(87) PCT Pub. No.: WO2021/109820
PCT Pub. Date: Jun. 10, 2021

(65) Prior Publication Data
US 2022/0043476 A1    Feb. 10, 2022

(30) Foreign Application Priority Data
Dec. 6, 2019 (CN) .......................... 201911241154.9

(51) Int. Cl.
*G06F 1/12* (2006.01)
*H04Q 9/04* (2006.01)

(52) U.S. Cl.
CPC ................. *G06F 1/12* (2013.01); *H04Q 9/04* (2013.01)

(58) Field of Classification Search
CPC ................. G06F 1/32; G06F 9/44; G06F 1/12
See application file for complete search history.

(56) References Cited

U.S. PATENT DOCUMENTS

| 8,975,744 B1* | 3/2015 | Lerma ..................... H01L 23/48 257/724 |
| 2006/0234382 A1* | 10/2006 | Wang ....................... C12Q 1/04 436/39 |

(Continued)

FOREIGN PATENT DOCUMENTS

| CN | 102548032 A | 7/2012 |
| CN | 104881989 A | 9/2015 |

(Continued)

*Primary Examiner* — Keshab R Pandey
(74) *Attorney, Agent, or Firm* — Muncy, Geissler, Olds & Lowe, P.C.

(57) ABSTRACT

The present disclosure discloses a time synchronous hybrid analog and digital sensor data acquisition system and method, comprising analog sensors, digital modules, digital sensors, hubs for networking a plurality of heterogeneous sensors, a local-area network device and a data processing terminal. The present disclosure solves the problem that data cannot be compared due to time difference in acquisition for the reason that the sampling time of different sensors cannot be synchronized precisely in the existing experiments and practical engineering, and also solves the problems of single function, low integration level and manpower consumption when different sensor instruments work separately. The data acquisition system of the present disclosure can be directly connected to various heterogeneous sensors to realize syn- (Continued)

chronous acquisition, synchronous transmission and simple and fast operation. The present disclosure greatly increases the time precision, amplitude precision and efficiency of synchronous acquisition, reduces the labor cost, and has wide application prospect.

6 Claims, 3 Drawing Sheets

(56) References Cited

U.S. PATENT DOCUMENTS

| | | | |
|---|---|---|---|
| 2010/0289480 A1* | 11/2010 | Soramoto | G01C 19/5607 324/85 |
| 2016/0330278 A1* | 11/2016 | Katayama | H04L 67/565 |
| 2016/0330793 A1 | 11/2016 | Zhuge et al. | |

FOREIGN PATENT DOCUMENTS

| | | |
|---|---|---|
| CN | 204761460 U | 11/2015 |
| CN | 105116848 A | 12/2015 |
| CN | 105720986 A | 6/2016 |
| CN | 110880233 A | 3/2020 |

\* cited by examiner

TIME SYNCHRONOUS HYBRID ANALOG AND DIGITAL SENSOR DATA ACQUISITION SYSTEM AND METHOD THEREOF

TECHNICAL FIELD

The present disclosure relates to the technical field of sensor monitoring, and particularly relates to a time synchronous hybrid analog and digital sensor data acquisition system and a signal processing method thereof.

BACKGROUND

Sensors are widely used in industries such as dike, dam, machinery, bridge and building for measuring the pressure, temperature, water level, wave height and other states of a measured object, and the values measured by the sensors are displayed by a display device.

The existing sensors generally output the measured values by means of analog signals. As the analog signals will be disturbed by various noises from the outside and in the communication system during transmission along lines, the noises and the signals are difficult to separate after mixing, which leads to the reduction of communication quality. The longer the lines are, the more the noises are accumulated, thereby causing low precision of the measured data. In addition, due to limitation of the characteristics of the analog signals, it is difficult to realize networking comparison of multiple sensor values, which makes it difficult to carry out comparative analysis by monitoring pressure value signals and to realize long-term mass archiving of signal data.

With the development and application of digitization, the original traditional sensors which sense data through analog signals are gradually replaced by digitals sensors which have long transmission distance and are convenient for computer processing. Digital sensors have obvious application advantages, but in some large projects, especially in projects where a large number of sensors are used for monitoring together, networking makes high requirements for data bandwidth, network stabilization and other aspects. From the perspective of the prior art, the transmission networking of multiple sensor signals and the signal processing method thereof are not mature enough.

SUMMARY

The technical problem to be solved by the present disclosure is to provide a clock synchronous digital sensing system which can remotely intelligently monitor a large number of sensors and a temperature and force measurement method, solving the problem that time difference exists in data acquisition for the reason that the sampling time of heterogeneous sensors cannot be synchronized precisely in the existing experiments and practical engineering, and also solving the problems of single function, low integration level and manpower consumption when different sensor instruments work separately. The data acquisition system of the present disclosure can be directly connected to various heterogeneous sensors to realize synchronous acquisition, synchronous transmission and simple and fast operation. The present disclosure greatly increases the precision and efficiency of synchronous acquisition, reduces the labor cost, and has wide application prospect.

To achieve the above purpose, the present disclosure adopts the following technical solution:

A time synchronous hybrid analog and digital sensor data acquisition system comprises analog sensors, digital modules, digital sensors, hubs, a local-area network device and a data processing terminal, wherein the hubs are in data connection with the data processing terminal through the local-area network device; and the analog sensors are connected with the digital modules.

Each digital module comprises a signal conditioning module, a signal amplification module and an A/D conversion module which are electrically connected in sequence through a control circuit, and also comprises a data interface connected with the hub and an interface connected with a clock synchronization circuit integrated on the hub;

The clock synchronization circuit is generated by the hub and used for synchronizing a synchronization signal broadcast by the data processing terminal, and the synchronization signal is generated by the hub and received by the connected digital module or digital sensor so as to realize synchronous data acquisition of the analog sensor and the digital sensor.

The analog sensors detect the physical signal of a detected object, generate the corresponding analog signals and then amplify the analog signals through the signal conditioning modules and the signal amplification modules, and the analog signals are converted to digital signals by the A/D conversion module. The signals converted by the A/D conversion module adapt to the long-distance transmission of data, simplify the complexity of the network layout of a plurality of systems and reduce the error caused by signal measurement due to long-distance transmission, and the signals are stable and have anti-interference capability. Meanwhile, the clock synchronization circuit is used for acquisition in all the sensors of the same network according to the unified clock, and the time dimension of comparison of multiple signals can be unified in the parallel test of a plurality of sensors so that the acquired data have a unified reference point in the time dimension, the comparability and scientificity are enhanced, and the acquired and stored signals have time dimension, which is conducive to signal analysis, processing and application.

Preferably, the digital module with a clock source also comprises an automatic identity recognition module which is integrated on the control circuit of the digital module, and the sensors are automatically recognized after being connected to the network so that networking is easier.

Preferably, the control circuit of the digital module is also integrated with an Soc chip which can be programed externally so as to process the sensor data accordingly. For example, an algorithm program is set in the Soc chip to executing compensated operation on the sensor data.

Preferably, each hub is a 485 hub that can convert the 485 bus interface of the sensor to the interface of the local area network, which is convenient to form a larger network system. The 485 hub constructs a network on the spot, which simplifies the complexity of networking lines.

Preferably, the local-area network device comprises a router, one end of the router can be in data connection with a plurality of 485 hubs, and the other end is in data connection with the data processing terminal.

Preferably, the data connection between the router and the data processing terminal is fiber-optic connection. Fiber optic network transmission breaks through the bottleneck of the transmission rate of traditional 485, which enables multiple hub signals to be centralized on the spot and then transmitted via the wide area network through the router.

In addition, the present disclosure also provides a signal processing method of the time synchronous hybrid analog and digital sensor data acquisition system, comprising the following steps:

Step 1: sensing the value of a measured object by the analog sensors and the digital sensors in the system, carrying out digital compensation and clock synchronization control, and digitally correcting and compensating the measured value;

Step 2: centralizing the data processed in step 1 and sensed by the analog sensors and the digital sensors by the hubs through data connection and outputting the data to the local-area network device through an output end;

Step 3: synthesizing the data transmitted from the hubs by the local-area network device, and then transmitting the data to the data processing terminal via the network for processing;

Step 4: comparing and visually displaying the data based on the timeline by the data processing terminal through programs, and outputting the monitoring result according to the monitoring needs.

Preferably, the signal processing method of the time synchronous hybrid analog and digital sensor data acquisition system also comprises the step of presetting parameters for and sending an instruction to the digital sensors by the data processing terminal and the step of carrying out sensing and feedback by the digital sensors according to the parameter instruction.

The present disclosure has the beneficial effect that the time synchronous hybrid analog and digital sensor data acquisition system converts analog signals to digital signals through the time synchronous analog sensors, digital modules and digital sensors and gives the sensed signals the timeline feature so as to enhance the comparability and scientificity of multiple signals, which is conducive to signal analysis, processing and application. Each sensor is given a unique identity identifier through the identity recognition module so that the sensors can be automatically recognized after being connected to the network, and finally, each sensor can be positioned and remotely monitored by the remote data processing terminal. The sensors can be controlled through programming by integrating the Soc chips, realizing intelligentization. Through the 485 hubs, the data storage collector, the local area network and other designs, the dependence of the system on the network is reduced, and a large amount of sensor data can be continuously acquired so that the system has the advantages of reliability, stability, universality and long-distance transmission.

DETAILED DESCRIPTION

The preferred embodiment of the present disclosure will be further described below in detail in combination with the drawings. Apparently, the described embodiments are merely part of the embodiments of the present disclosure, not all of the embodiments. Based on the embodiments in the present disclosure, all other embodiments obtained by those ordinary skilled in the art without contributing creative labor will belong to the protection scope of the present disclosure.

The present disclosure is further described in detail in combination with the drawings and specific embodiments.

Figure 1:
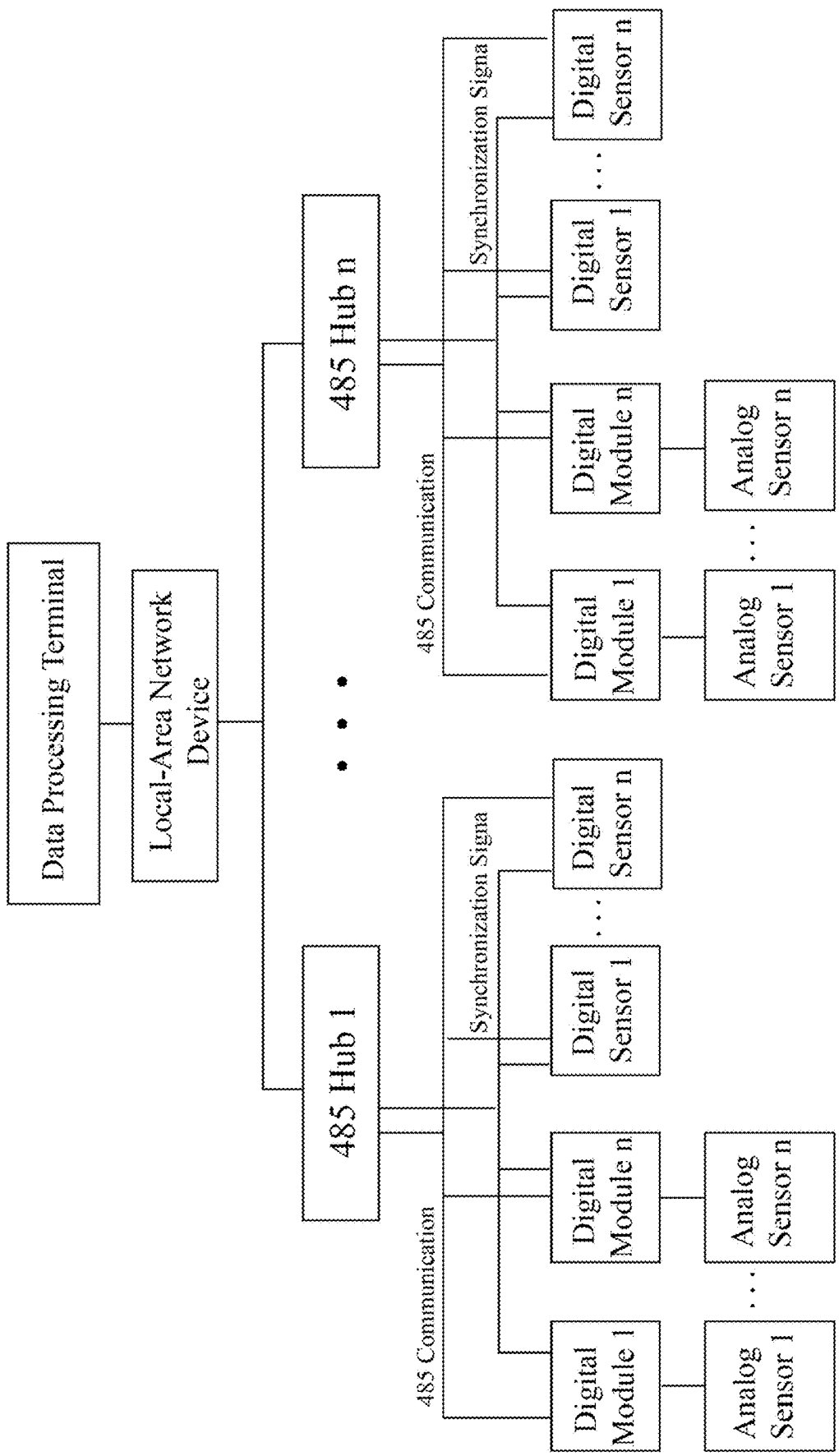
FIG. 1 is a structural schematic diagram of an embodiment of a time synchronous hybrid analog and digital sensor data acquisition system of the present disclosure.
Figure 2:
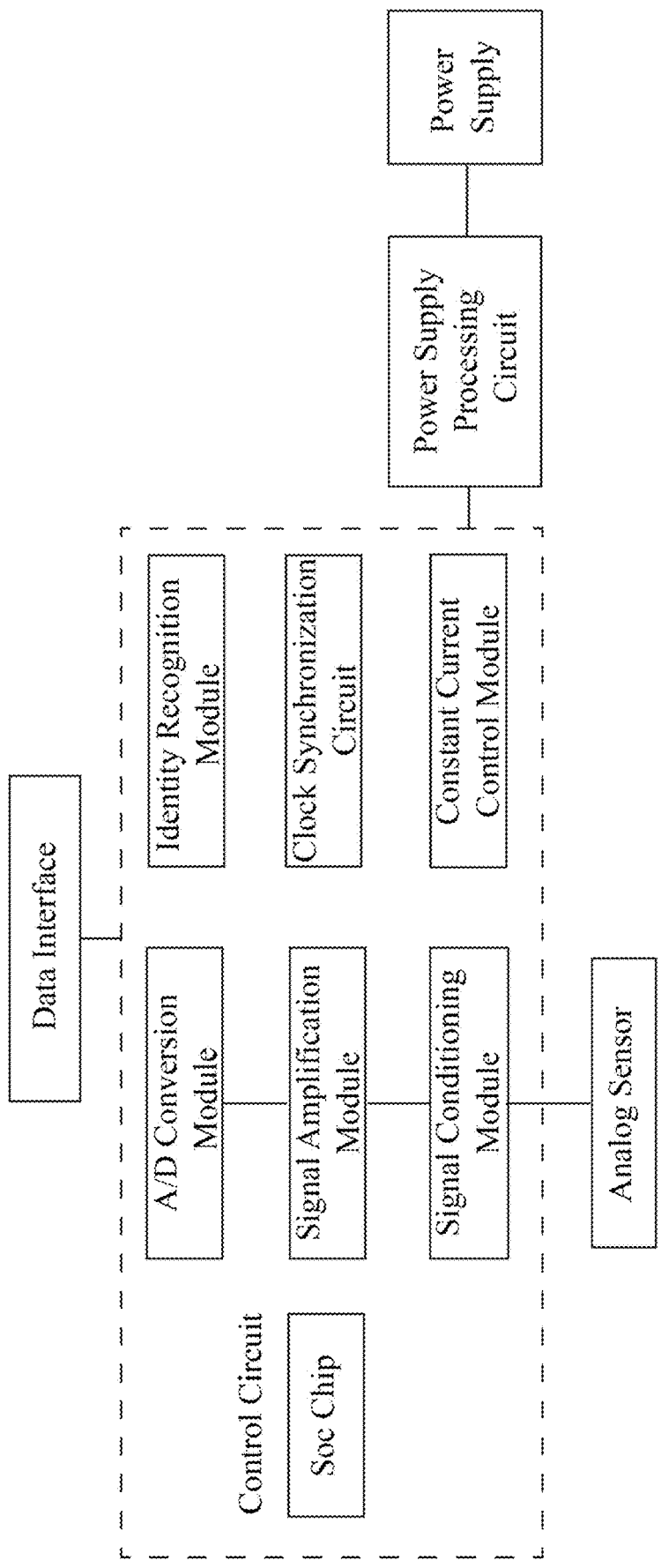
FIG. 2 is a structural schematic diagram of a circuit of a time synchronous digital sensor of an embodiment of a time synchronous hybrid analog and digital sensor data acquisition system of the present disclosure.

As shown in FIG. 1 and FIG. 2, the time synchronous hybrid analog and digital sensor data acquisition system comprises analog sensors, digital modules, digital sensors, hubs for networking a plurality of sensors, a local-area network device and a data processing terminal, wherein each digital module comprises a signal conditioning module, a signal amplification module and an A/D conversion module which are electrically connected in sequence through a control circuit, a data interface connected with the control circuit, and a clock synchronization circuit integrated on the control circuit, the digital modules and the digital sensors are in data connection with the hubs, and the hubs are in data connection with the data processing terminal through the local-area network device.

As shown in FIG. 2, each digital module also comprises an automatic identity recognition module which is integrated on the control circuit, and the sensors are automatically recognized after being connected to the network so that networking is easier.

Each digital module also comprises a constant current control module used for powering the sensor.

The control circuit is also integrated with an Soc chip which can be programed externally so as to process the sensor data accordingly. For example, an algorithm program is set in the Soc chip to executing compensated operation on the sensor data.

In the embodiment, each hub is a 485 hub that can convert the 485 bus interface of the sensor to the interface of the local area network, which is convenient to form a larger network system. The 485 hub constructs a network on the spot, which simplifies the complexity of networking lines.

The local-area network device comprises a router, one end of the router can be in data connection with a plurality of 485 hubs, and the other end is in data connection with the data processing terminal.

The data connection between the router and the data processing terminal is fiber-optic connection. Fiber optic network transmission breaks through the bottleneck of the transmission rate of traditional 485, which enables multiple hub signals to be centralized and then transmitted via the wide area network through the router.

Figure 3:
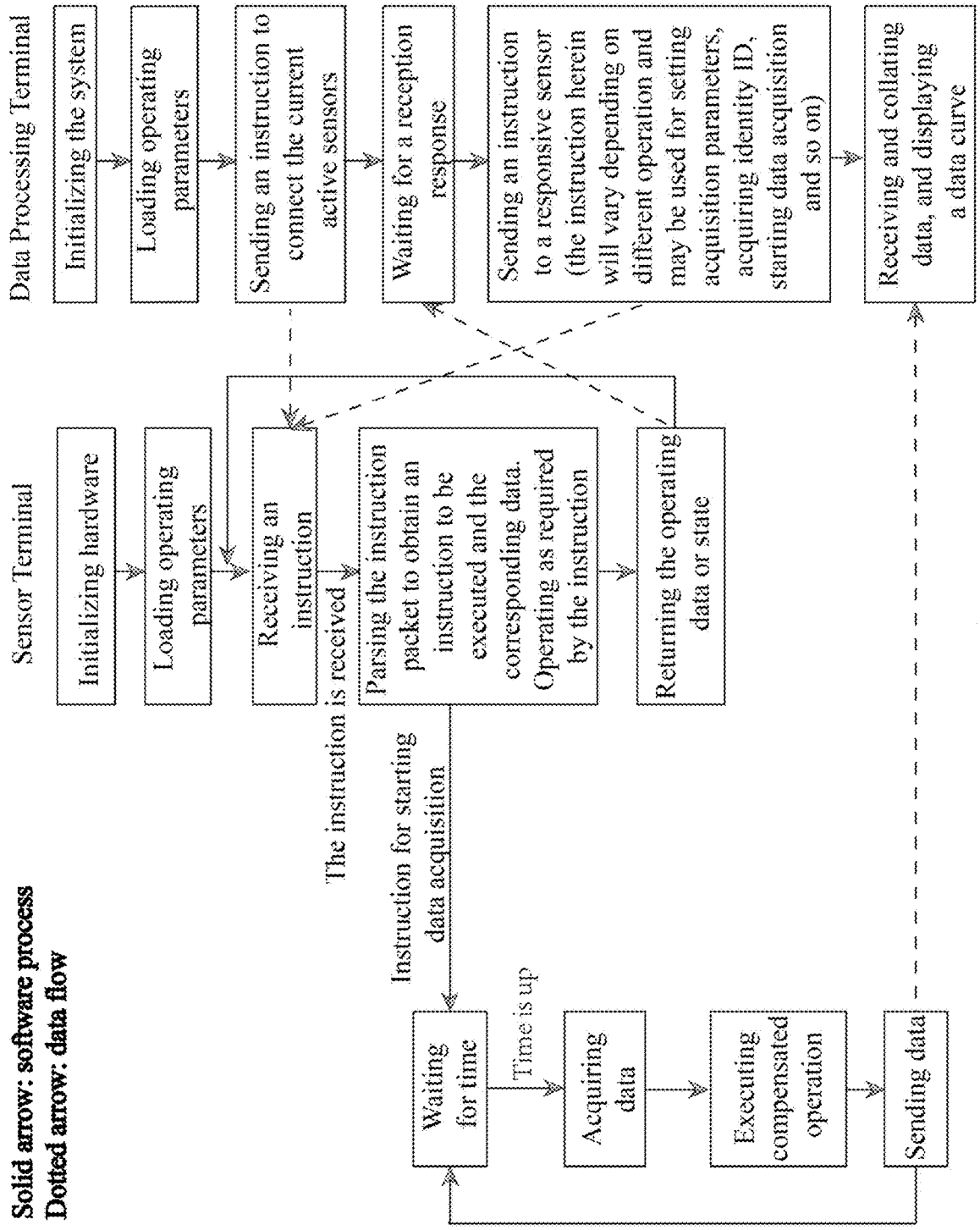
FIG. 3 is a flow chart of an embodiment of a signal processing method of a time synchronous hybrid analog and digital sensor data acquisition system of the present disclosure.

As shown in FIG. 1, FIG. 2 and FIG. 3, in combination with the time synchronous hybrid analog and digital sensor data acquisition system, the present disclosure also provides a signal processing method of the time synchronous hybrid analog and digital sensor data acquisition system. The sensor initialization run program and the data processing terminal startup run program are common knowledge and software programming design problems, and thus are not described herein. Specifically, the signal processing method comprises the following steps:

Step 1: sensing the value of a measured object by the analog sensors and the digital sensors in the system, carrying out digital compensation and clock synchronization control, and digitally correcting and compensating the measured value;

Step 2: centralizing the data processed in step 1 and sensed by the analog sensors and the digital sensors by the hubs through data connection and outputting the data to the local-area network device through an output end;

Step 3: synthesizing the data transmitted from the hubs by the local-area network device, and then transmitting the data to the data processing terminal via the network for processing;

Step 4: comparing and visually displaying the data based on the timeline by the data processing terminal through programs, and outputting the monitoring result according to the monitoring needs.

Here, the received sensor data can be sorted into tables, curves and acoustic-optical signals through program processing of the data processing terminal to provide operators with alert and analytical research observation data and so on.

As shown in FIG. 3, the signal processing method of the time synchronous hybrid analog and digital sensor data acquisition system also comprises the step of presetting parameters for and sending an instruction to the digital sensors by the data processing terminal and the step of carrying out sensing and feedback to return the operating data or state by the digital sensors according to the parameter instruction.

Finally, it should be noted that the above embodiment is only a preferred embodiment of the present disclosure, and is not intended to limit the present disclosure. Although the present disclosure is described in detail with reference to the above embodiment, those skilled in the art may still modify the technical solution recorded in the above embodiment, or equivalently replace some of the technical features. Any modification, equivalent replacement, improvement, etc. made within the spirit and the principle of the present disclosure shall be included within the protection scope of the present disclosure.

The invention claimed is:

1. A signal processing method using a time synchronous hybrid analog and digital sensor data acquisition system, the time synchronous hybrid analog and digital sensor data acquisition system, comprising analog sensors, digital modules, digital sensors, hubs, a local-area network device and a data processing terminal, wherein the hubs are in data connection with data processing terminal through a local-area network device; and the analog sensors are connected with the digital modules;

each digital module comprises a signal conditioning module, a signal amplification module and an A/D conversion module which are electrically connected in sequence through a control circuit, and also comprises a data interface connected with the hub and an interface connected with a clock synchronization circuit integrated on the hub;

the clock synchronization signal is generated by the hub and used for synchronizing a synchronization signal broadcast by a data processing terminal, and the synchronization signal is generated by the hub and received by the connected digital module or digital sensor so as to realize synchronous data acquisition of the analog sensor and the digital sensor, the method comprising steps of:

step 1: sensing value of a measured object by the analog sensor and the digital sensor in the system, carrying out digital compensation and clock synchronization control, and digitally correcting and compensating the value;

step 2: centralizing the value processed in step 1 and sensed by the analog sensor and the digital sensor by the hub through data connection and outputting the value to the local-area network device through an output end;

step 3: synthesizing data transmitted from the hub by the local-area network device, and then transmitting the data to the data processing terminal via network for processing;

step 4: comparing and visually displaying the data based on the timeline by the data processing terminal through programs, and outputting a monitoring result according to a monitoring needs.

2. The signal processing method according to claim 1, wherein each digital module also comprises an identity recognition module.

3. The signal processing method according to claim 1, wherein each digital module is also integrated with an Soc chip.

4. The signal processing method according to claim 1, wherein each hub is a 485 hub used for converting 485 bus data interfaces of the analog sensors and the digital modules to data interface of the local-area network device.

5. The signal processing method according to claim 1, also comprising the step of presetting parameters for and sending an instruction to the digital sensor by the data processing terminal and a step of carrying out sensing and feedback by the digital sensor according to a parameter instruction.

6. The signal processing method according to claim 1, wherein digitally correcting and compensating the value in step 1 is one of least squares curve fitting, polynomial curve fitting, broken line fitting and table look-up interpolation fitting.

* * * * *